July 6, 1943.　　　F. V. NUGENT　　　2,323,563
TREAD MEMBER FOR SHOES
Filed March 24, 1942
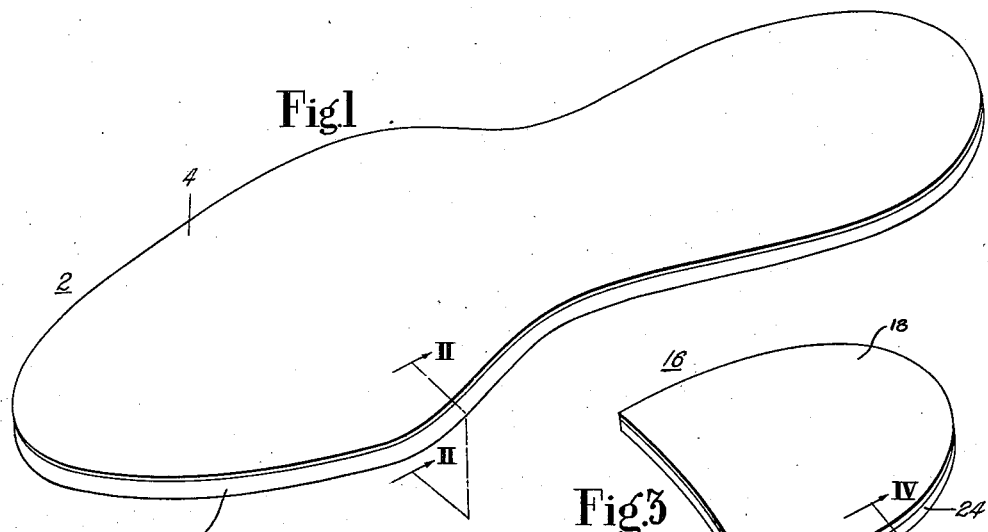
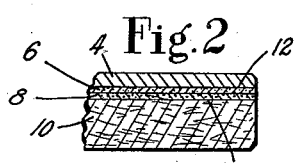
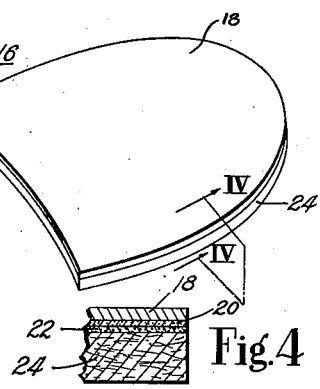
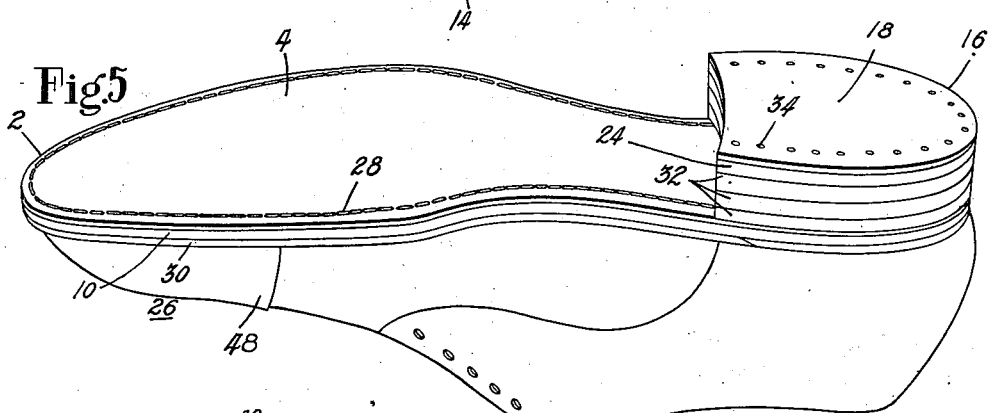
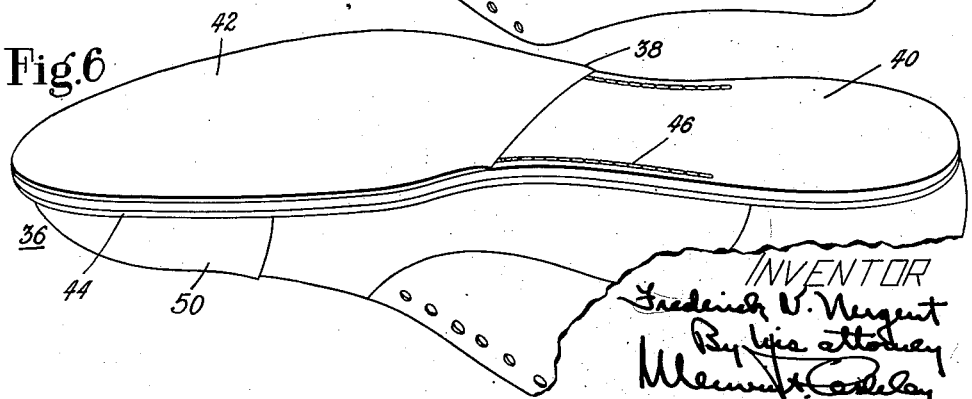

Patented July 6, 1943

2,323,563

UNITED STATES PATENT OFFICE 2,323,563

TREAD MEMBER FOR SHOES

Frederick V. Nugent, Abington, Mass., assignor to B. B. Chemical Co., Boston, Mass., a corporation of Massachusetts Application March 24, 1942, Serial No. 435,998

3 Claims. (Cl. 36—30)

This invention relates to shoe manufacture, and more particularly to tread members, such as outsoles and heel top lifts.

Vinyl resin in sheet form exhibits attractive possibilities as shoe material, but its utilization has involved shoemaking difficulties. Thus sheet vinyl resin does not constitute a satisfactory substance through which to pass stitches in preparing a tread member by a sewing operation, because of the tendency of the vinyl resin sheet to tear between the stitch holes. The disadvantages of using mechanical fastening means are obvious. On the other hand, in attempting to form shoe tread members by attaching vinyl resin sheet to leather by means of the usual commercial shoe cements, satisfactory adhesion for shoe tread purposes has not been obtained. This is the case if it is attempted to use pyroxylin, rubber cement, rubber latex, or polymerized chloroprene for this purpose.

An object of this invention is to provide a shoe tread member, such as an outsole or heel top lift, having a tread surface of sheet vinyl resin, and wherein the vinyl resin is securely and permanently attached to a leather layer.

In the accomplishment of the above and other objects, I have provided a shoe tread member having a tread surface of sheet vinyl resin and a backing layer of leather, and wherein a film of chlorinated rubber is adhesively secured to said vinyl resin sheet, a film of polymerized chloroprene is adhesively secured to said chlorinated rubber, and the leather layer is adhesively secured to said polymerized chloroprene.

Conveniently the tread member may be prepared by roughing the attaching surface of the vinyl resin sheet, and depositing a film of chlorinated rubber thereon by applying thereto a solution of chlorinated rubber and permitting said solution to dry. A liquid dispersion or colloidal solution of polymerized chloroprene may then be applied to the dried film of chlorinated rubber and to the attaching surface of the leather layer, and the solution permitted partially to dry. The vinyl resin sheet and the leather backing layer then may be pressed together with their polymerized chloroprene surfaces in juxtaposition, whereby a film of polymerized chloroprene is formed which is adhesively secured to the chlorinated rubber, and whereby the leather layer is adhesively secured to said polymerized chloroprene. The attaching pressure may be applied simultaneously over the areas to be joined as in a plate press, or the pressure may be applied progressively, as by passing the parts through wringer rolls.

By the present invention I have provided a tread member wherein the tread surface and the backing layer are secured together firmly and closely without gaping between the parts, and wherein the parts will remain secured together even when subjected to the stresses and conditions encountered in shoe wear.

In the drawing,

Fig. 1 is a perspective view of a shoe outsole according to the invention;

Fig. 2 is a fragmentary enlarged diagrammatic sectional view taken on line II—II of Fig. 1;

Fig. 3 is a perspective view of a shoe heel top lift according to the invention;

Fig. 4 is a fragmentary enlarged diagrammatic sectional view taken on line IV—IV of Fig. 3;

Fig. 5 is a perspective view of a shoe having an outsole and a heel lift in accordance with this invention, the outsole being attached by means of "aloft" stitching; and Fig. 6 is a fragmentary perspective view of a shoe having an outsole in accordance with this invention, the vinyl resin layer overlying stitches securing the outsole to the shoe.

The tread member contemplated by this invention has a sheet vinyl resin tread surface and a leather layer. The vinyl resin sheet material may comprise polyvinyl acetate, polyvinyl chloride, a copolymer of vinyl acetate and vinyl chloride, polyvinyl acetal or other suitable vinyl resin. The vinyl resin sheet material ordinarily contains a suitable plasticizer, such as dibutyl cellosolve phthalate, or dibutyl sebacate.

A preferred form of chlorinated rubber for use in this invention is that containing about 67% of chlorine and marketed under the trade names "Parlon" or "Tornesit" by the Hercules Powder Company, Wilmington, Delaware. For the purposes of this invention the chlorinated rubber may be employed in the form of a solution of Tornesit in a solvent therefor. A suitable solution is one containing 15 to 20% by weight of Tornesit dissolved in a solvent composed of equal parts of methyl ethyl ketone and toluene. The Tornesit itself may have a viscosity characteristic of from 5 to 1000 centipoises. Alternatively, the chlorinated rubber solution may contain dissolved vinyl resin and in such case the solution may contain about 10% by weight of Tornesit together with 10% by weight of low molecular weight vinyl resin (for example "VYHF" resin, manufactured by Carbide and Carbon Chemicals Corporation) all dissolved in equal parts of methyl ethyl ketone and toluene.

The polymerized chloroprene employed for the purposes of this invention is chloroprene (also known as chloro-2-butadiene-1,3) which has been partially polymerized and is plastic in the sense that it may be worked on the rolls of a rubber mill and compounded with other ingredients in a manner similar to that in which crude rubber is treated. Such plastic polymerized chloroprene may be "cured" or "vulcanized" to a condition in which it is elastic rather than plastic and in which condition it resembles vulcanized rubber. This "curing" is probably a further ploymerization of the partially polymerized chloroprene to a substantially fully polymerized condition rather than the addition of sulphur to the polymer such as is considered to occur in the vulcanization of rubber.

The polymerized chloroprene dispersions or colloidal solutions employed for the purposes of this invention may vary widely in composition but one which I have found very satisfactory is that disclosed in Macdonald Patent 2,163,609 and which is as follows.

|  | Grams |
|---|---|
| Plastic polymerized chloroprene (containing 2% phenyl-beta-naphthylamine) | 900 |
| Wood rosin (FF) | 45 |
| Magnesium oxide (light calcined) | 90 |
| Zinc oxide | 45 |
| Phenyl-beta-naphthylamine (stabilizer) | 9 |
| Benzene | 1,690 |
| Trichlorethylene | 2,850 |
| Sulphur | 27 |
| Du Pont accelerator #808 (butyraldehyde aniline condensation product) | 12 |

In Figs. 1 and 2 there is illustrated a tread member in the shape of an outsole 2, which has a tread surface layer 4 composed of a vinyl resin sheet. Adhesively secured to the vinyl resin layer 4 is a film of chlorinated rubber 6. A film of polymerized chloroprene 8 is adhesively secured to the chlorinated rubber 6, and a layer of leather 10 is adhesively secured to the polymerized chloroprene 8.

In preparing the outsole 2, a leather layer 10 of outsole leather stock, and a tread surface layer 4 of vinyl resin sheet, both of suitable size and shape, may be provided. The attaching surface 12 of the vinyl resin sheet 4 may be roughed in any suitable manner. To the roughed attaching surface 12 may be applied by brush or other suitable means, a chlorinated rubber solution such as hereinbefore described. This chlorinated rubber solution may be permitted to dry in the atmosphere for from about 15 minutes to an hour or longer, whereby a chlorinated rubber film 6 is deposited upon and adhesively attached to the attaching surface 12 of the vinyl resin sheet 4.

Following the securing of the chlorinated rubber film 6 to the vinyl resin sheet 4, a liquid dispersion or colloidal solution of polymerized chloroprene, such as described above, may be applied by brush or other suitable means over the chlorinated rubber film 6 on the vinyl resin sheet 4.

The attaching surface 14 of the leather layer 10 may be roughed in any suitable manner. To the attaching surface 14 may then be applied, by brush or in any other suitable manner, a liquid dispersion or colloidal solution of polymerized chloroprene, such as hereinbefore described.

When the polymerized chloroprene cements on the chlorinated rubber film 6 and on the attaching surface 14 of the leather layer 10 have dried to a condition in which they are adhesive to each other, which may require a period in the neighborhood of an hour, the vinyl resin sheet 4 and leather layer 10 may be pressed together with their polymerized chloroprene coated surfaces in juxtaposition to form a laminated structure embodying the polymerized chloroprene film 8.

The vinyl resin sheet 4 and leather layer 10 may be pressed together in a hydraulic or other press at a pressure of about fifty pounds or more per square inch and for a time about five seconds or longer. Alternatively, the vinyl resin sheet 4 and leather layer 10 may be passed through wringer rolls under a pressure of about fifty pounds or more per square inch.

In Figs. 3 and 4 I have shown a tread member in the shape of a heel top lift 16, which has a tread surface layer 18 composed of a vinyl resin sheet. Adhesively secured to the vinyl resin layer 18 is a film of chlorinated rubber 20. A film of polymerized chloroprene 22 is adhesively secured to the chlorinated rubber 20, and a layer of leather 24 is adhesively secured to the polymerized chloroprene 22.

The heel top lift 16 may be prepared by providing a suitably shaped vinyl resin sheet 18 and a suitably shaped leather heel layer 24, and associating them with the chlorinated rubber film 20 and the polymerized chloroprene film 22 in the manner described hereinabove with respect to the outsole 2.

Alternatively, the outsole 2 and heel top lift 16 might be prepared by securing together vinyl resin sheets and leather layers of indeterminate size in the manner described above and dyeing out or cutting out outsoles and heel top lifts therefrom.

In Fig. 5 I have illustrated a shoe 26 embodying an outsole 2 and heel top lift 16 according to this invention. Thus, the outsole 2 with the vinyl resin tread surface 4 is shown as stitched by "aloft" stitching 28 to the welt 30. The heel top lift 16 is shown as secured to the lower lifts 32 of the heel by slugs or nails 34. Conveniently, the nails 34 may be driven below the surface of the vinyl resin layer 18, in order that the tread surface of the heel may be free from metal. Alternatively, the nails might be driven through the leather layer 24 prior to the attachment of the vinyl resin layer 18 thereto, and in such cases, the layer 18 might be secured to the layer 24 either before or after the attachment of the layer 24 to the heel layers 32. Furthermore, the top lift 16 might be secured to the other heel portions 32 by adhesive rather than by nails, or in any other suitable manner.

In Fig. 6 is illustrated a shoe 36 having an outsole 38 according to this invention wherein the leather layer 40 extends the full length of the shoe but the vinyl resin layer 42 extends only over the forepart area of the outsole 38. The chlorinated rubber film layer and the polymerized chloroprene film layer of the outsole 38 are not shown in enlargement. As illustrated, the leather layer 40 of the outsole 38 is secured to the welt 44 by stitches 46, and the vinyl resin layer 42 overlies the stitches 46.

The outsole 38 may be prepared in the manner described above so far as the central portion of the vinyl resin layer 42 is concerned but omitting the polymerized chloroprene film around the marginal portions of the layer 42. Such marginal portions may then be raised during the operation of stitching the outsole to the welt 44 by means of stitches 46, following which the polymerized chloroprene film may be incorporated at the marginal portions of the outsole 38 in the manner hereinbefore described. By this procedure the portion of the stitching 46 beneath the vinyl resin layer 42 is concealed. Alternatively, the vinyl resin sheet layer 42 may be secured to the leather layer 40 after the layer 40 has been secured to the welt 44 in the manner described above, and in such case the vinyl resin sheet layer 42 and the leather layer 40 may be pressed together conveniently in a machine such as disclosed in Ballard Patent No. 2,047,185.

In Figs. 5 and 6, the leather layers 10 and 40, respectively, may of course be attached to the shoe uppers 48 and 50, respectively, by adhesive, rather than by stitching as illustrated.

Having described my invention, what I claim as new and desire to secure by Letters Patent of the United States is:

1. A tread member for shoes comprising a tread surface layer of vinyl resin, a film of chlorinated rubber adhesively secured to said vinyl resin, a film of polymerized chloroprene adhesively secured to said chlorinated rubber, and a layer of leather adhesively secured to said polymerized chloroprene.

2. A shoe structure according to claim 1 wherein the tread member is an outsole.

3. A shoe structure according to claim 1 wherein the tread member is a heel top lift.

FREDERICK V. NUGENT.